(12) United States Patent
Ogasawara et al.

(10) Patent No.: US 8,999,552 B2
(45) Date of Patent: Apr. 7, 2015

(54) BUSBAR MODULE AND POWER SUPPLY UNIT INCLUDING SAME BUSBAR MODULE

(75) Inventors: Shigeyuki Ogasawara, Makinohara (JP); Keizo Aoki, Makinohara (JP); Shinichi Yanagihara, Makinohara (JP)

(73) Assignee: Yazaki Corporation, Tokyo (JP)

( * ) Notice: Subject to any disclaimer, the term of this patent is extended or adjusted under 35 U.S.C. 154(b) by 357 days.

(21) Appl. No.: 13/394,436

(22) PCT Filed: Sep. 7, 2010

(86) PCT No.: PCT/JP2010/065693
§ 371 (c)(1),
(2), (4) Date: Mar. 6, 2012

(87) PCT Pub. No.: WO2011/027917
PCT Pub. Date: Mar. 10, 2011

(65) Prior Publication Data
US 2012/0164509 A1   Jun. 28, 2012

(30) Foreign Application Priority Data
Sep. 7, 2009   (JP) ................................ 2009-205578

(51) Int. Cl.
*H01M 2/26* (2006.01)
*H01R 4/60* (2006.01)
*H01R 11/28* (2006.01)
(Continued)

(52) U.S. Cl.
CPC .............. *H01R 11/281* (2013.01); *H01R 9/226* (2013.01); *H01M 2/206* (2013.01); *H01M 2/1077* (2013.01); *H01M 2220/20* (2013.01)

(58) Field of Classification Search
CPC .... H01M 2/206; H01M 2/1077; H01R 9/226; H01R 11/281
USPC .......................................... 429/121; 439/212
See application file for complete search history.

(56) References Cited

U.S. PATENT DOCUMENTS 6,152,776 A    11/2000   Ikeda et al.
6,261,719 B1    7/2001   Ikeda et al.
(Continued)

FOREIGN PATENT DOCUMENTS

CN    1259781 A    7/2000
CN    1815815 A    8/2006
(Continued)

OTHER PUBLICATIONS

Office Action dated Dec. 2, 2013 issued by the State Intellectual Property Office of the People's Republic of China in counterpart Chinese Patent Application No. 201080039790.4.
(Continued)

*Primary Examiner* — Jonathan Jelsma
(74) *Attorney, Agent, or Firm* — Sughrue Mion, PLLC

(57) ABSTRACT

A busbar module for connecting a plurality of batteries of a battery unit in which the batteries are arranged so that electrodes of each of the batteries having different polarities are disposed adjacent to each other is provided. The busbar module includes busbars, terminals, wires and plates. The busbars connect the electrodes adjacent to each other. The terminals are connected to the busbars respectively to detect a voltage of the batteries. The wires are connected to the terminals respectively. The plates accommodate the busbar, the terminals and the wires, and provided above the battery unit. A connector connects the plates together.

7 Claims, 9 Drawing Sheets

(51) Int. Cl.
　　　*H01R 9/22*　　(2006.01)
　　　*H01M 2/20*　　(2006.01)
　　　*H01M 2/10*　　(2006.01)

(56) References Cited

U.S. PATENT DOCUMENTS

| | | |
|---|---|---|
| 6,290,552 B1 | 9/2001 | Saito et al. |
| 6,325,640 B1 | 12/2001 | Kasai |
| 7,604,507 B1 | 10/2009 | Millon |
| 2001/0039150 A1 | 11/2001 | Saito et al. |
| 2001/0044241 A1 | 11/2001 | Saito et al. |
| 2001/0046816 A1 | 11/2001 | Saito et al. |
| 2002/0086578 A1 | 7/2002 | Ikeda |
| 2002/0098743 A1 | 7/2002 | Schell et al. |
| 2002/0102457 A1 | 8/2002 | Oogami et al. |
| 2004/0043663 A1 | 3/2004 | Ikeda et al. |
| 2006/0022522 A1 | 2/2006 | Plummer |
| 2007/0018612 A1 | 1/2007 | VanLuvanee, Jr. |
| 2009/0130904 A1 | 5/2009 | Bonfils |

FOREIGN PATENT DOCUMENTS

| | | |
|---|---|---|
| CN | 101442156 A | 5/2009 |
| EP | 0986114 A1 | 3/2000 |
| EP | 1054461 A1 | 11/2000 |
| EP | 1621410 A2 | 2/2006 |
| GB | 2330252 A | 4/1999 |
| JP | 2000-149909 A | 5/2000 |
| JP | 2000-333343 A | 11/2000 |
| JP | 2002-164034 A | 6/2002 |
| JP | 2008-166209 A | 7/2008 |

OTHER PUBLICATIONS

International Search Report (PCT/ISA/210) issued by the International Searching Authority in corresponding International Application No. PCT/JP2010/065693 on Dec. 16, 2010.

Written Opinion (PCT/ISA/237) of the International Searching Authority, issued in corresponding International Application No. PCT/JP2010/065693 on Dec. 16, 2010.

International Preliminary Report on Patentability (PCT/IPEA/409), issued by the International Preliminary Examining Authority in corresponding International Application No. PCT/JP2010/065693 on Feb. 3, 2012.

Communication dated Aug. 1, 2014 from the State Intellectual Property Office of P.R. China in a counterpart application No. 201080039790.4.

Office Action, Issued by the Japanese Patent Office, Dated Aug. 12, 2014, In counterpart Japanese Application No. 2010-196645.

BUSBAR MODULE AND POWER SUPPLY UNIT INCLUDING SAME BUSBAR MODULE

TECHNICAL FIELD

The present invention relates to a power supply unit for use in a hybrid vehicle or an electric vehicle and a busbar module which is included in the power supply unit.

BACKGROUND ART

A power supply unit as disclosed in PTL 1 is mounted in, for example, an electric vehicle which is driven by use of an electric motor or a hybrid vehicle which is driven by use of an engine in combination with an electric motor as a drive source of the electric motor. This power supply unit includes a battery unit and a busbar module. The battery unit is made up of a plurality of batteries, of which each battery has a positive electrode at one end and a negative electrode at the other end. The batteries are arranged neatly into a pile in such a way that electrodes having different polarities are laid adjacent to each other. The busbar module is laid on an upper surface of the battery unit where the electrodes are provided. FIG. 8 is a top view of the related busbar module disclosed in PTL 1. FIG. 9 is an enlarged view of part of the busbar module shown in FIG. 8.

The busbar module 101 shown in FIG. 8 and the like includes a plurality of busbars 103 which connect the plurality of batteries of the battery unit, not shown, in series by connecting the electrodes of the batteries which are laid adjacent to each other, a plurality of terminals 104 which are connected individually to the busbars 103 for detecting a voltage of the batteries to which the busbars 103 connect, a plurality of electric wires 105 which are connected individually to the terminals 104 and a plate 106 which accommodates the plurality of busbars 103, the plurality of terminals 104 and the plurality of electric wires 105. In FIG. 8, the plurality of electric wires 105 are omitted from illustration. In addition, an arrow X denotes a direction in which the plurality of batteries 20 are arranged neatly into a pile.

The busbar 103 is made of a metallic plate and a pair of holes 103a are provided therein through which the electrodes, which have a cylindrical shape, are passed. A positive electrode is passed through one of the pair of holes 103a and a negative electrode is passed through the other of the holes 103a, whereby the busbar 103 connects the batteries which are arranged to lie adjacent to each other in such a way that their electrodes having different polarities are laid adjacent to each other. The terminal 104 includes a plate-shaped electrode connector 141 which is placed on the busbar 103 and which has a hole 141a through which the electrode which is passed through one of the holes 103a is passed and an electric wire connector 143 which is connected with one end of the electric wire 105. The electrode connector 141 and the electric wire connector 143 are formed integrally. The terminal 104 is connected to a voltage detection circuit, which will be described later, via the electric wire 105 so as to output potentials of the positive electrode and the negative electrode of the batteries which are connected together by the busbar 103 to the voltage detection circuit.

The plate 106 has, as an overall planar shape, a substantially rectangular shape which is substantially equal in shape and size to the upper surface of the battery unit on which the electrodes are provided. The plate 106 is laid on the upper surface of the battery unit. The plate 106 includes a plurality of primary plates 106A which are aligned in a straight line along the arrow X and a secondary plate 106B which is positioned at an end portion of the plurality of primary plates 106A. The plates 106A, 106B are connected together by the other ends of the plurality of electric wires 105 which are attached to the respective terminals 104 at the one end thereof being disposed from one primary plate 106A to the other plates 106A, 106B which are arranged adjacent to each other. Note that in FIG. 8, only one of the plurality of primary plates 106A is shown.

The primary plate 106A includes a plurality of primary accommodating portions 160 which each accommodate the busbar 103 and the terminal 104 which is connected to the busbar 103 and which are aligned along the direction in which the plurality of batteries are arranged neatly into a pile, that is, the direction indicated by the arrow X, a plurality of secondary accommodating portions 164 having a trough shape which are aligned on a straight line which is parallel to the direction indicated by the arrow X in which the plurality of primary accommodating portions 160 are aligned for accommodating the electric wires 105 which are attached to the respective terminals 104, a plurality of lid portions 167 which are connected individually to the secondary accommodating portions 164 via hinges so as to open or close opening portions of the secondary accommodating portions 164 and a plurality of tertiary accommodating portions 168 which each connect the primary accommodating portion 160 and the secondary accommodating portion 164 which are laid to face each other with a space provided therebetween and accommodate the electric wire connector 143 of the terminal 104 and the one end of the electric wire 105 to which the electric wire 143 is attached. The other end of the electric wire 105 which is accommodated in the tertiary accommodating portion 167 is bent at substantially 90 degrees so as to be accommodated in the secondary accommodating portion 164.

The secondary plate 106B includes a plurality of primary accommodating portions 160 which each accommodate the busbar 103 and the terminal 104 which is connected to the busbar 103 and which are aligned along the direction in which the plurality of batteries are arranged neatly into a pile, that is, the direction indicated by the arrow X, a plurality of secondary accommodating portions 164 having a trough shape which are aligned on a straight line which is parallel to the direction indicated by the arrow X in which the plurality of primary accommodating portions 160 are aligned for accommodating the electric wires 105 which are attached to the respective terminals 104, a plurality of lid portions 167 which are connected individually to the secondary accommodating portions 164 via hinges so as to open or close opening portions of the secondary accommodating portions 164, a plurality of tertiary accommodating portions 168 which each connect the primary accommodating portion 160 and the secondary accommodating portion 164 which are laid to face each other with a space provided therebetween and accommodate the electric wire connector 143 of the terminal 104 and the one end of the electric wire 105 to which the electric wire 143 is attached, and an electric wire fixing portion 107 which fixes the other ends of the electric wires 105 which are disposed at an end portion of the secondary plate 106B which lies on a side lying farther away from the primary plate 106A. Namely, the electric wire fixing portion 107 is provided at the end portion of the secondary plate 106B. The electric wire fixing portion 107 has a rod-like shape and is continued from the secondary accommodating portion 164. An adhesive tape is wound round outer circumferences of the electric wire fixing portion 107 and the plurality of electric wires 105 which are placed round the electric wire fixing portion 107, whereby the plurality of electric wires 105 are fixed to the electric wire fixing portion 107 that is the secondary plate 106B.

CITATION LIST

Patent Literature

[PTL 1] JP-A-2008-166209

SUMMARY OF INVENTION

Technical Problem

In the related busbar module 101, however, the plates 106A, 106B are connected to each other by the other ends of the plurality of electric wires 105 to the one end of which the terminals 104 are attached being disposed from the one primary plate 106 to the other plates 106A, 106B which are laid adjacent to each other. Thus, in the event that only one of the plates 106A, 106B which are connected to each other is grabbed to be carried, the electric wire 105 which is disposed to extend from the one to the other of the plates 106A, 106B is pulled, leading to a fear that the electric wire 105 which is attached to the terminal 104 is removed from the terminal 104.

In addition, in the related busbar module 101, in fixing the electric wires 105 which are attached to the respective terminals 104, it is necessary to fabricate the secondary plate 106B on which the electric wire fixing portion 107 is provided. Consequently, two types of molds are necessary by which the primary plate 106A on which no electric fixing portion 107 is provided and the secondary plate 106B on which the electric wire fixing portion 107 is provided are molded, leading to a problem that the cost incurred in preparation of the molds is increased.

The invention has been made in view of the problematic points inherent in the related art, and an object thereof is to provide a busbar module which can prevent an electric wire which is disposed to extend from one plate to the other plate of plates which are connected to each other from being removed from a terminal to which the electric wire is attached when grabbing to carry only the one plate and a power supply unit which includes this busbar module.

Solution to Problem

With a view to solving the problem, according to a first aspect of the invention, there is provided a busbar module for connecting a plurality of batteries of a battery unit in which the batteries are arranged so that electrodes of each of the batteries having different polarities are disposed adjacent to each other, the busbar module including: a plurality of busbars that connect the electrodes adjacent to each other; a plurality of terminals connected to the busbars respectively to detect a voltage of the batteries; a plurality of wires connected to the terminals respectively; a plurality of plates accommodating the busbar, the terminals and the wires, and provided above the battery unit; and a connector connecting the plates together.

According to a second aspect of the invention, there is provided a busbar module as set forth in the first aspect of the invention, wherein the connector includes: a first connecting piece provided at one end portion of the plate and formed with a projection; and a second connecting piece provided at another end portion of the plate and formed with a hole, wherein the first connecting piece of one of the plates is configured to be inserted into the second connecting piece of another one of the plates adjacent to the one of the plates.

According to a third aspect of the invention, there is provided a busbar module as set forth in the first or second aspect of the invention, wherein a plurality of connector like the connector are provided.

According to a fourth aspect of the invention, there is provided a busbar module as set forth in any of the first to third aspects of the invention, wherein a wall portion is provided on a part of the first connecting piece where is an edge portion in a width direction orthogonal to an arrangement direction of the batteries, and an engaging projection for engaging the second connecting piece is projected from the wall portion.

According to a fifth aspect of the invention, there is provided a busbar module as set forth in any of the first to fourth aspects of the invention, the connector includes: a fixing member, in a state that the wire is laid on the second connecting piece, inserted into the hole and wound around circumferences of the second connecting piece and the wire so as to fix the wire to the second connecting piece.

According to a sixth aspect of the invention, there is provided a busbar module as set forth in the fifth aspect of the invention, wherein the fixing member is a binding band.

According to a seventh aspect of the invention, there is provided a power supply unit comprising a plurality of batteries of a battery unit in which the batteries are arranged so that electrodes of each of the batteries having different polarities are disposed adjacent to each other, and a busbar module as set forth in any of the first to sixth aspects of the invention.

Advantageous Effects of Invention

As has been described heretofore, according to the first aspect of the invention, the busbar module includes the connector which connects the plurality of plates together. Thus, there can be provided the busbar module which can prevent the plurality of electric wires which are disposed to extend from the one plate to the other one from being removed from the terminals to which the electric wires are attached when grabbing to carry one of the plurality of plates which are connected to each other.

According to the second aspect of the invention, the connector includes the first connecting piece which is provided at one end portion of the plate and which includes the projecting portion which projects to rise from the surface thereof and the second connecting piece which is provided at the other end portion of the plate and in which the hole portion is provided into which the projecting portion penetrates when laid on the first connecting piece of the plate laid adjacent thereto. Thus, the plurality of plates can be connected together by the simple work to cause the projecting portion to penetrate into the hole portion.

According to the third aspect of the invention, the plurality of connectors like the connector are provided, and therefore, the plurality of plates can be connected to each other in an ensured fashion.

According to the fourth aspect of the invention, the engaging projection is provided which is provided on the erected wall portion which is erected from the widthwise edge of the first connecting piece and which locks the second connecting piece. Thus, the plurality of plates can be connected to each other in an ensured fashion.

According to the fifth aspect of the invention, the connector includes the fixing member which is passed into the inside of the hole portion with the electric wires laid on the second connecting piece and is then wound around the outer circumferences of the second connecting piece and the electric wires to thereafter fix the electric wires to the second connecting piece. Thus, the electric wires can be fixed to the plate in an ensured fashion.

In addition, With the plurality of electric wires laid on the second connecting piece, the fixing member is wound around the outer circumferences of the second connecting piece and the electric wires, whereby the electric wires are fixed to the second connecting piece which is positioned at the one end portion of the busbar module (that is, the end portion of the plurality of plates). In addition, the plurality of plates are connected to each other by causing the projecting portion of the plate laid adjacent thereto to penetrate into the hole portion of the second connecting piece which is positioned in a different position from the end portion of the plurality of plates. In this way, the plate which includes the second connecting piece which fixes the plurality of electric wires to the plate or which connects the plates 6 laid adjacent to each other together can be molded by a single mold, thereby making it possible to reduce the costs.

According to the sixth aspect of the invention, the binding band is used as the fixing member. The plurality of electric wires can be fixed to the plate in an ensured fashion by simple work to wind a band main body of the binding band around the outer circumferences of the electric wires and the second connecting piece and to pass the other end portion of the band main body through a through opening provided in a binding portion of the binding band.

According to the seventh aspect of the invention, the power supply unit includes the busbar module that has been described above. Thus, there can be provided the power supply unit which includes the busbar module which can prevent the plurality of electric wires which are disposed to extend from the one plate to the other one from being removed from the terminals to which the electric wires are attached when grabbing to carry one of the plurality of plates which are connected to each other.

DESCRIPTION OF EMBODIMENTS

Figure 1:
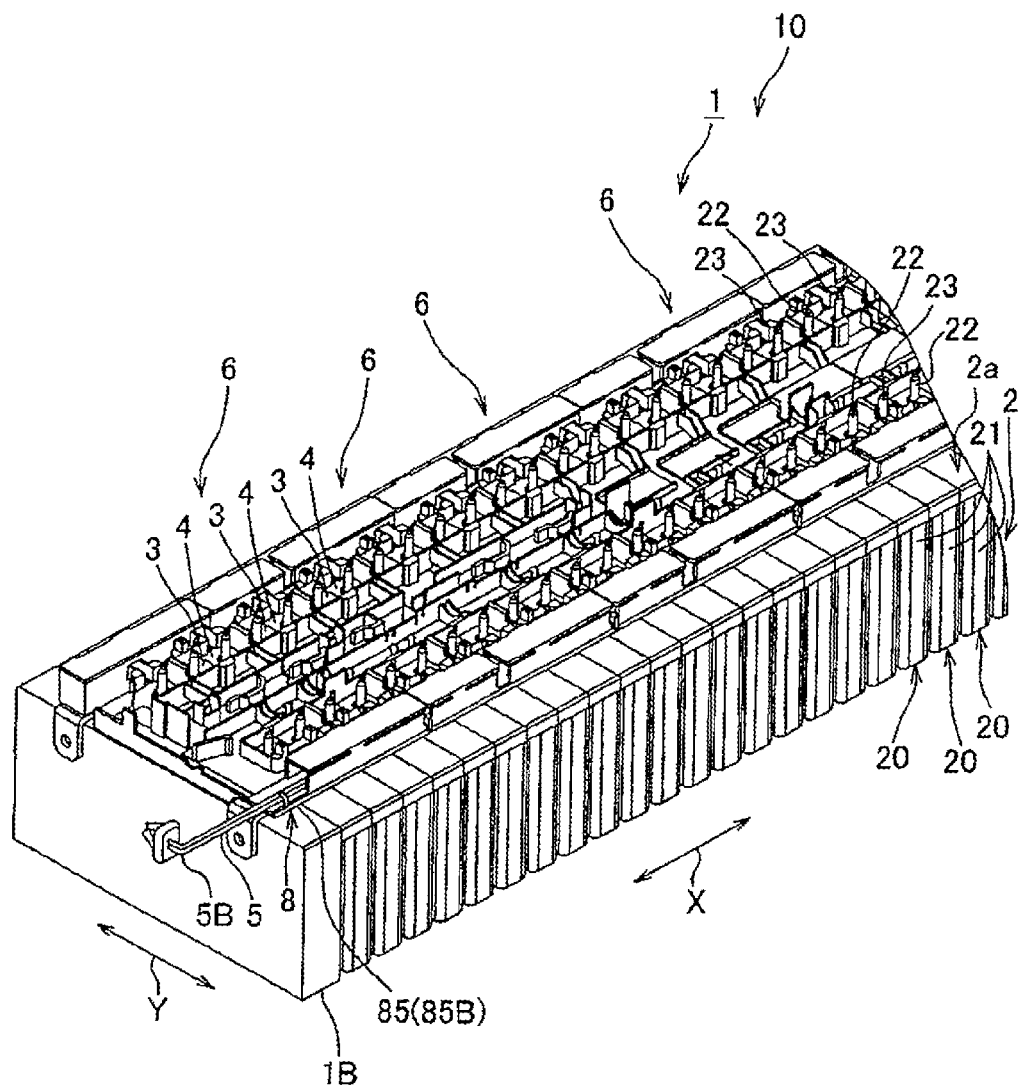
FIG. 1 is a perspective view showing a power supply unit according to an embodiment of the invention.

A busbar module 1 shown in FIG. 1 is mounted on a battery stack or assembly 2 so as to constitute a power supply unit 10. This power supply unit 10 is mounted in an electric vehicle which runs by use of an electric motor or a hybrid vehicle which runs by use of an engine in combination with an electric motor so as to supply power to the electric motor.

The battery unit 2 includes a plurality of batteries 20 and a member for fixing the plurality of batteries 20 by arranging them neatly into a pile. Each battery 20 includes a rectangular parallelepiped battery main body 21 and a pair of electrodes 22, 23 which project respectively from one end and the other end of an upper surface of the battery main body 21. One electrode 22 of the pair of electrodes 22, 23 is a positive electrode or a positive electrode, and the other electrode 23 is a negative electrode or a negative electrode. These electrodes 22, 23 are each made of a conductive metal and have a cylindrical shape. Further, the plurality of batteries 20 are arranged neatly into a pile with the electrodes 22, 23 having different polarities arranged adjacent to each other.

The busbar module 1 is designed to connect the plurality of batteries 20 in series. As is shown in FIG. 1, the busbar module 1 includes a plurality of busbars 3 for connecting the plurality of batteries 20 in series by connecting the electrodes 22, 23 of the adjacent batteries 20 of the battery unit 2, a plurality of terminals 4 which are connected individually to the busbars 3 for detecting a voltage of the batteries 20, a plurality of electric wires 5 which are connected individually to the terminals 4, a connector to which the other ends 5B of the plurality of electric wires 5 which are connected individually to the terminals 4 at one end thereof are connected, a plurality of plates 6 which accommodate these components and which are laid on the upper surface 2a of the battery unit 2 where the electrodes 22, 23 are provided, and a connector 8 which connects the plates 6 laid adjacent to each other together. The connector connects the terminals to a voltage detection circuit, not shown, by being connected to a mating connector. In addition, an arrow X in FIG. 1 denotes a direction in which the plurality of batteries 20 are arranged neatly into a pile, a direction in which the plurality of plates are aligned and a longitudinal direction of the plate 6. An arrow Y denotes a width direction of the plate 6.

The busbar 3 can be obtained by pressing a conductive metallic plate, and a pair of holes 3a are provided in the metallic plate through which the electrodes 22, 23 of the adjacent batteries 20 are passed. The busbar 3 is fixed to the batteries 20 by nuts which are screwed on to the electrodes 22, 23 which are passed through the holes 3a.

Figure 3:
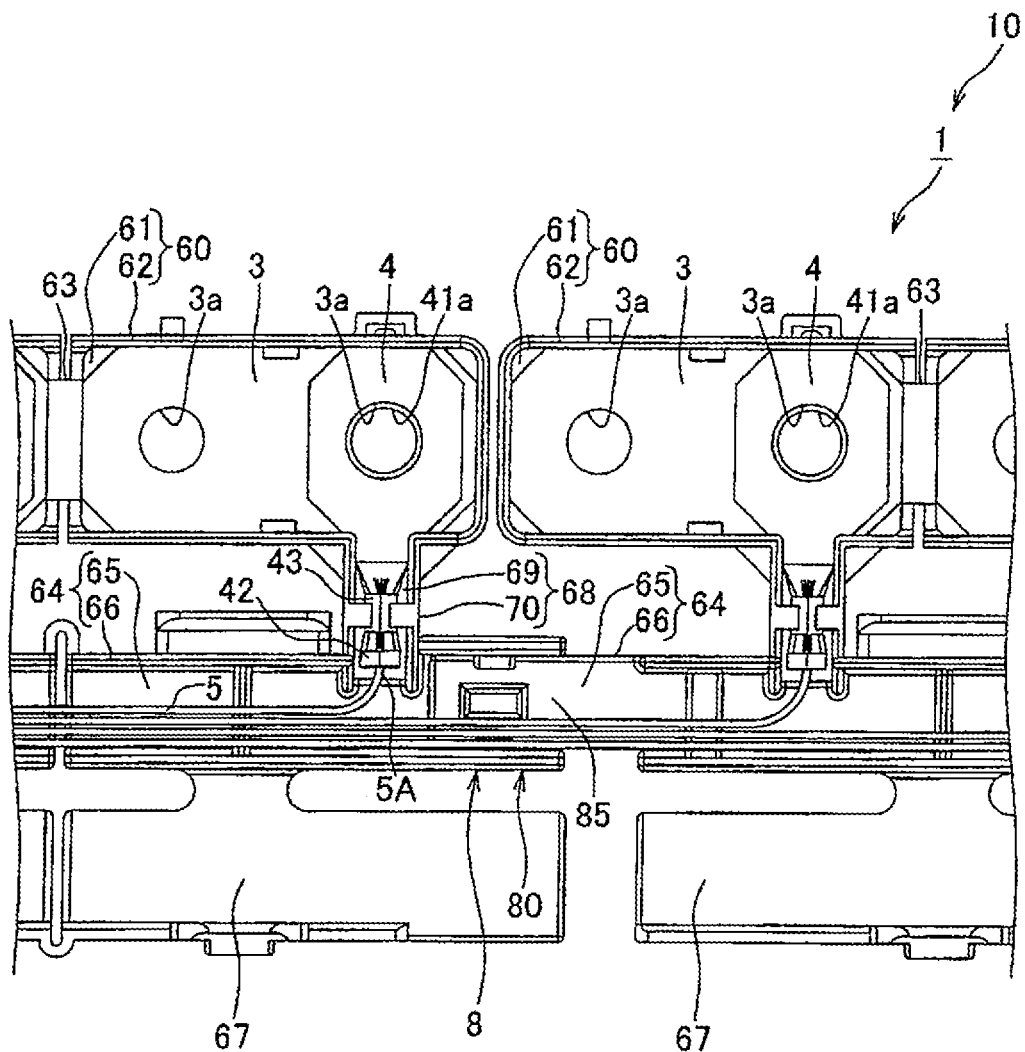
FIG. 3 is an enlarged view of part of the busbar module shown in FIG. 2.
Figure 4:
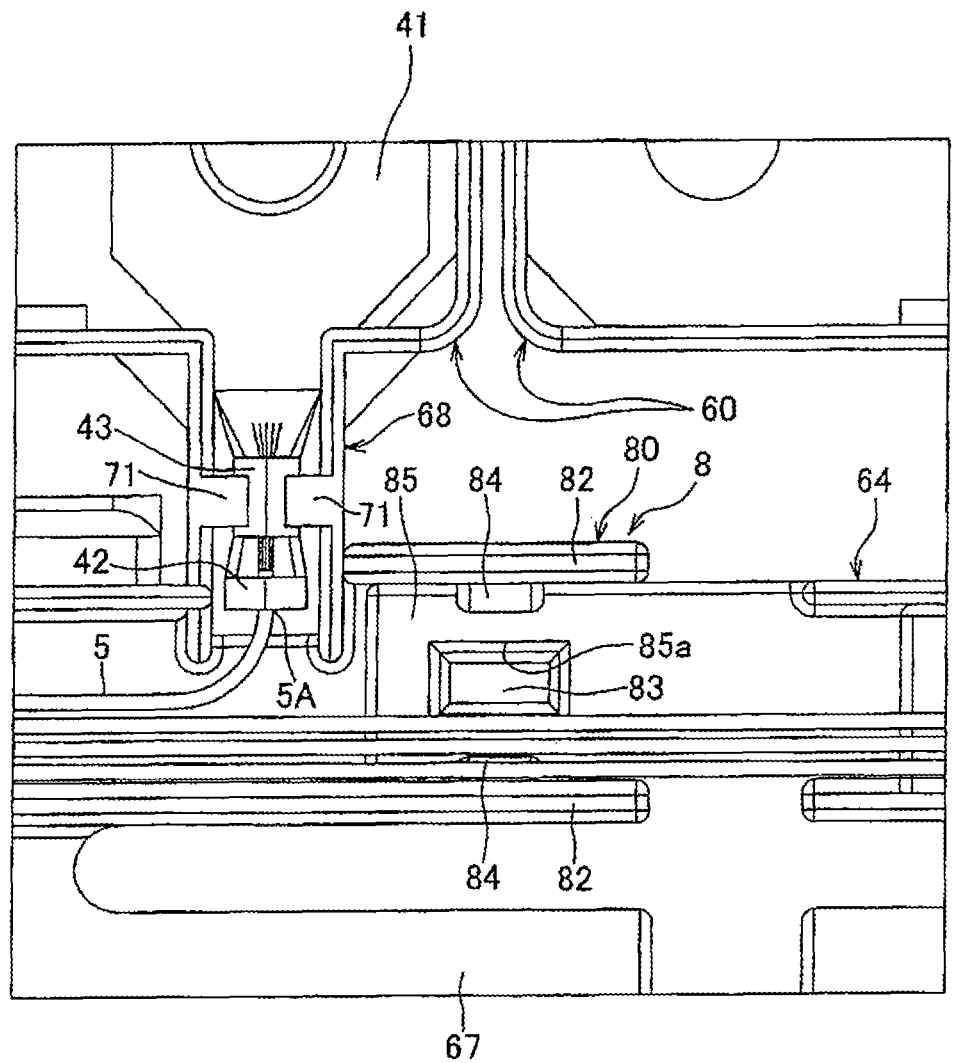
FIG. 4 is an enlarged view of a main part of the busbar module shown in FIG. 2.

The terminal 4 can be obtained by pressing a conductive metallic plate, and as is shown in FIGS. 3 and 4, the terminal 4 includes a busbar connector 41 which is laid on the busbar 3 so as to be electrically connected to the busbar 3, an electric wire connector 43 which is attached to one end 5A of the electric wire 5 and an electric wire attaching portion 42. A hole 41a is provided in the busbar connector 41 which is made of the metallic plate through which the electrode 22 or 23 is passed. The electric wire connector 43 is made up of a pair of clamping pieces which clamp a core wire of the electric wire 5 which is exposed at the one end 5A thereof for electrical connection therewith. The electric wire attaching portion 42 is made up of a pair of clamping pieces which clamp the one end 5A of the electric wire 5. The busbar connector 41, the electric wire connector 43 and the electric wire attaching portion 42 are disposed so as to be aligned into a straight line. The terminal 4 is connected to the voltage detection circuit, which will be described later, via the electric wire 5 which is connected to the terminal 4 so as to output potentials of the positive electrode 22 and the negative electrode 23 of each battery 20.

The electric wire 5 is a known covered electric wire 5 having a conductive core wire and an insulating covering which covers the core wire. The insulating covering is stripped off at the one end 5a of the electric wire 5 so that the core wire is exposed thereat.

The plurality of plates 6 are aligned along the arrow X and are connected to each other by the connector 8. An overall planar shape of the plurality of plates 6 which are connected to each other has a substantially rectangular shape which is substantially equal in shape and size of the upper surface 2a of the battery unit 2 and is laid on the upper surface 2a. The plate 6 includes a plurality of primary accommodating portions 60 which each accommodate the busbar 3 and the terminal 4 which is connected to the busbar 3 and which are aligned along the direction in which the plurality of batteries 20 are arranged neatly into a pile, that is, along the arrow X, a plurality of connecting members 63 which each connect the primary accommodating portions 60 which are arranged adjacent to each other, a plurality of secondary accommodating portions 64 which are aligned into a straight line which is parallel to the direction in which the plurality of primary accommodating portions 60 are aligned, that is, the arrow X so as to accommodate the electric wires 5 which are connected individually to the terminals 4, lid portions 67 which are connected to the secondary accommodating portions 64 via hinges so as to open or close opening portions of the secondary accommodating portions 64 and a plurality of tertiary accommodating portions 68 which are consecutive to the primary accommodating portions 60 and the secondary accommodating portions 64 and which accommodate the electric wire attaching portions 42 which are attached to the ends 5A of the electric wires 5 and the electric wire connectors 43. FIGS. 2, 3, 4 and 7 show a state in which the lid portions 67 open the opening portions of the secondary accommodating portions 64.

The plurality of primary accommodating portions 69 are aligned along the longitudinal direction of the plate 6 or along the arrow X. Two rows of primary accommodating portions 60 which are each made up of the plurality of primary accommodating portions 60 aligned are provided along the width direction of the plate 6, that is, along the arrow Y with a space provided therebetween. Each primary accommodating portion 60 is formed into a box shape by a bottom wall 61 on a surface of which the busbar 3 is positioned and a circumferential wall 62 which is erected from an outer edge of the bottom wall 61. Holes (not shown) are provided in the bottom wall 61 so as to overlap the holes 3a in the busbar 3, whereby the electrodes 22, 23 which are passed through the holes are passed through the holes 3a in the busbar 3 and the holes 41a of the terminals 4.

The connecting member 63 has a C-shaped section. Both end portions of the connecting member 63 having the C-shaped section connect upper end portions of the circumferential walls 62 of the adjacent primary accommodating portions 60 which are spaced away from the bottom walls 61.

The secondary accommodating portions 64 are provided in a pair so as to be spaced apart from each other along the width direction of the plate 6 or along the arrow Y and are positioned so that the rows of primary accommodating portions in each of which the plurality of primary accommodating portions 60 are aligned in the way described above are disposed between the pair of secondary accommodating portions aligned. The secondary accommodating portion 64 is formed into a trough shape by a bottom wall 65 on a surface of which the plurality of electric wires 5 are positioned and side walls 66 which are erected from both end portions of the bottom wall 65 in the direction of the arrow Y.

Figure 7:
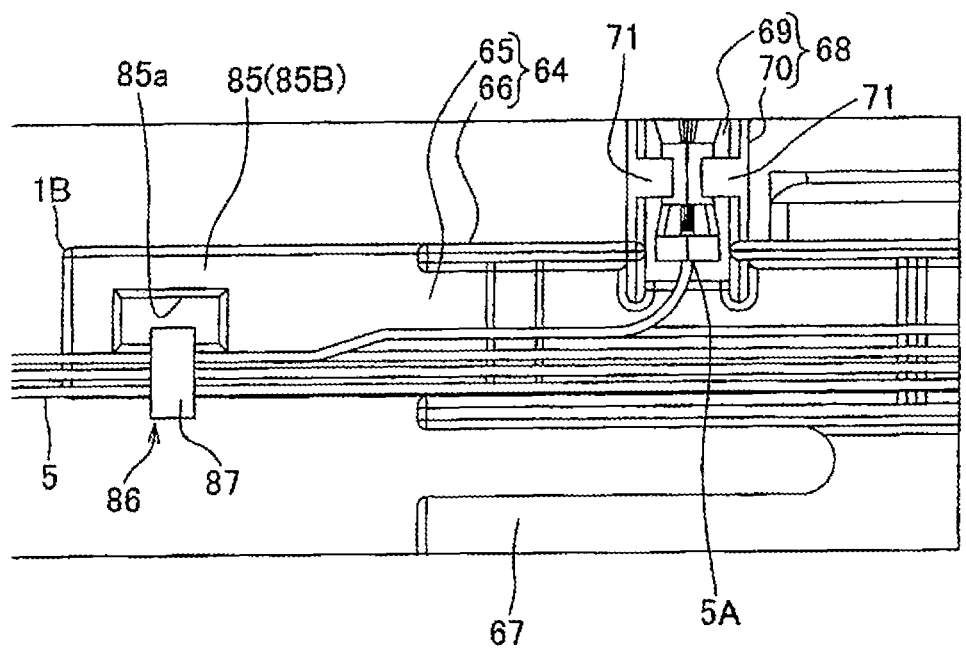
FIG. 7 is an explanatory diagram for explaining assembly work of the busbar module shown in FIG. 1, which shows a state in which electric wires are laid on the second connecting piece shown in FIG. 6 and are bound by the binding band as the fixing member.
Figure 8:
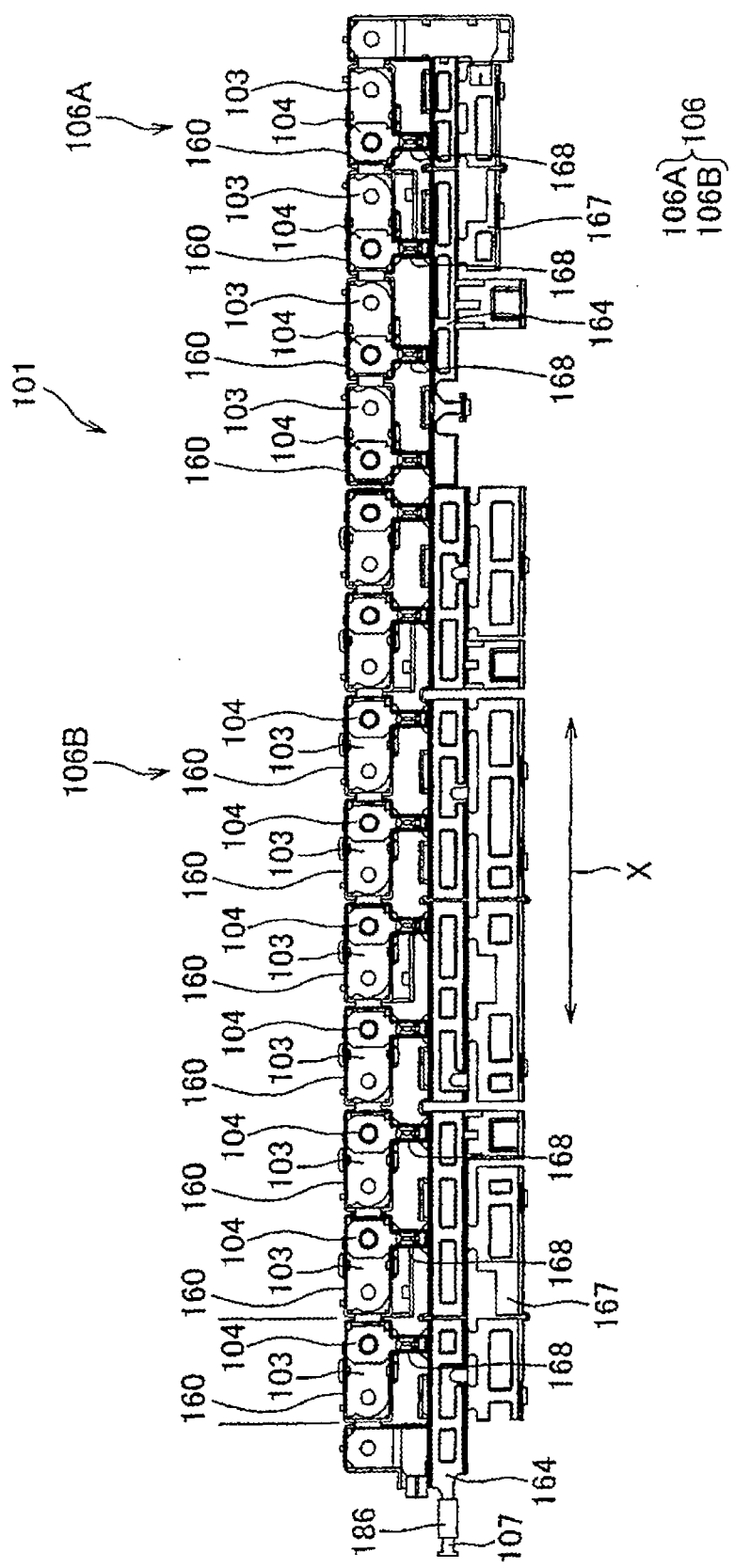
FIG. 8 is a top plan view of a related busbar module.
Figure 9:
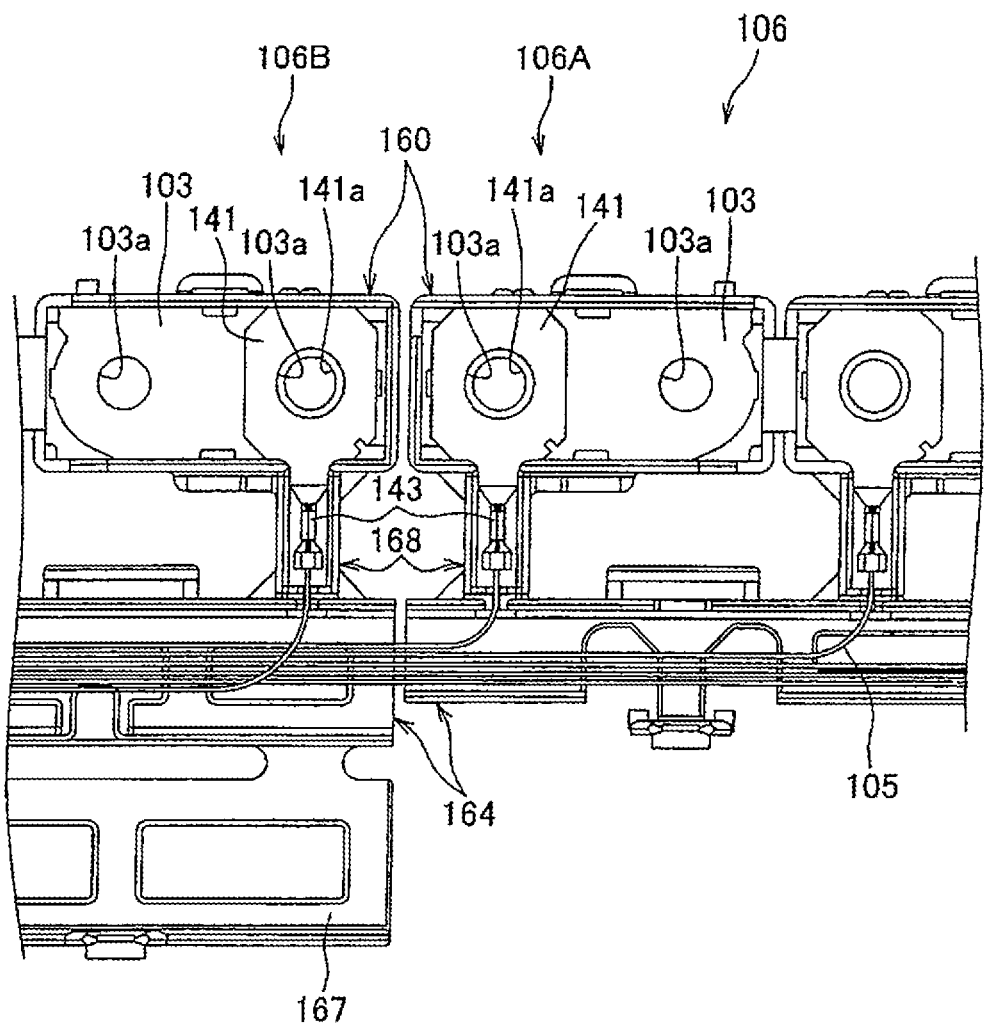
FIG. 9 is an enlarged view of part of the busbar module shown in FIG. 8.

The tertiary accommodating portion 68 is provided along the width direction of the plate 6 or along the arrow Y. The tertiary accommodating portion 68 is formed into a trough shape by a bottom wall 69 which connects the bottom wall 61 of the primary accommodating portion 60 and the bottom wall 65 of the secondary accommodating portion 64 which face each other and a pair of connecting walls 70 which are erected from outer edges of the bottom wall 69 and which connect the circumferential wall 62 of the primary accommodating portion 60 and the side wall 66 of the secondary accommodating portion 64 which face each other. A connector between the electric wire 5 and the terminal 4 is positioned on a surface of the bottom wall 69. The "connector" means the electric wire attaching portion 42 and the electric wire connector 43 of the terminal 4 and the one end 5A of the electric wire 5 to which the electric wire attaching portion 42 and the electric wire connector 43 are attached. In addition, as is shown in FIG. 7, the other end 5B of the electric wire 5 the one end 5A of which is accommodated in the tertiary accommodating portion 68 is bent at substantially 90 degrees so as to be accommodated in the secondary accommodating portion 64. Each tertiary accommodating portion 68 includes upper walls 71 which project in a direction which corresponds to the direction in which the bottom wall 69 expands from upper end portions of the connecting walls 70 which are spaced away from the bottom wall 69. These upper walls 71 position the electric wire 5 between the bottom wall 69 and themselves so as to prevent the electric wire 5 from popping out of the tertiary accommodating portion 68.

Figure 2:
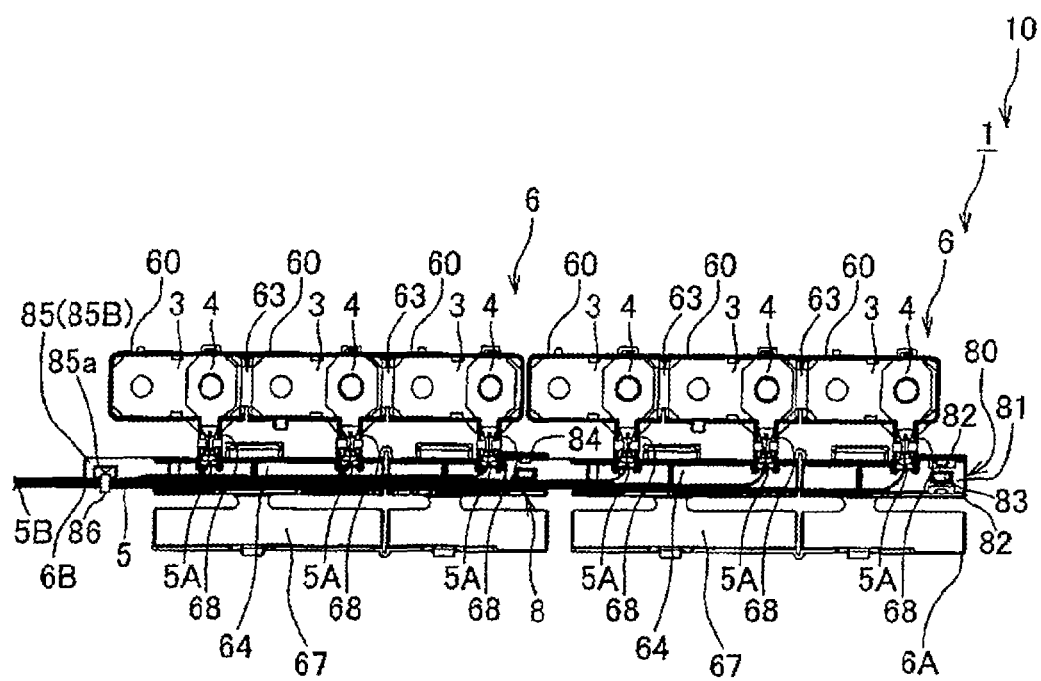
FIG. 2 is a top plan view showing part of a busbar module which makes up the power supply unit according to the embodiment of the invention.

As is shown in FIG. 2 and the like, the plurality of electric wires 5 are disposed so as to extend from one end portion 6A to the other end portion 6B of the plate 6 along the longitudinal direction thereof or the direction of the arrow X by the other end portions 5B of the plurality of electric wires 5 which are attached individually to the electric wire attaching portions 42 and the electric wire connectors 43 of the respective terminals 4 at the one end 5A thereof being accommodated in the second accommodating portion 64. The other end portions 5B of the plurality of electric wires 5 which are positioned at the other end portion 6B of the plate 6 are fixed to a second connecting piece 85, which will be described later.

The connector 8 includes a primary connector 80, the secondary connector 85 which is locked on the primary connector 80 of the plate 6 laid adjacent thereto and a binding band 86 as a fixing member. Another connector 8 is provided so that the pair (or plurality) of connectors 8 are provided along the width direction of the plate 6 or along the direction of the arrow Y with a space provided therebetween.

Figure 5:
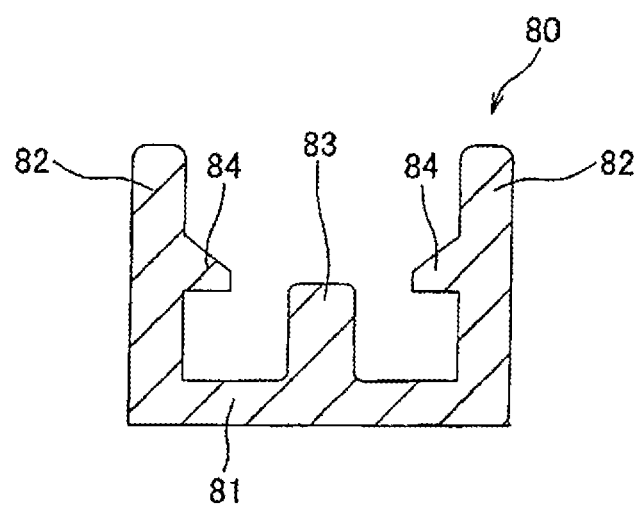
FIG. 5 is a sectional view showing a primary connector of a plate which makes up the busbar module shown in FIG. 2.

As is shown in FIG. 5, the primary connector 80 has a trough shape as an overall cross-sectional shape. The primary connector 80 includes a first connecting piece 81 which connects to both one end portion of the bottom wall 65 of one secondary accommodating portion 64 of the pair of secondary accommodating portions 64 and the other end portion of the bottom wall 65 of the other secondary accommodating portion 64 of the pair of secondary accommodating portions, a pair of erected wall portions 82 which are erected from both end portions of the first connecting piece 81 in a width direction thereof (namely, the direction of the arrow Y) so as to face each other, a projecting portion 83 which projects to rise from a surface of the first connecting piece 81, and locking pieces 84 which lock the second connecting piece 85. Namely, the first connecting piece 81 is provided at least one end portion 6A (shown in FIG. 2) of the plate 6 in the longitudinal direction thereof, that is, in the direction of the arrow X. The engaging projections are provided on the pair of erected wall portions 82 which face each other and project inwards of the erected wall portions 82.

Figure 6:
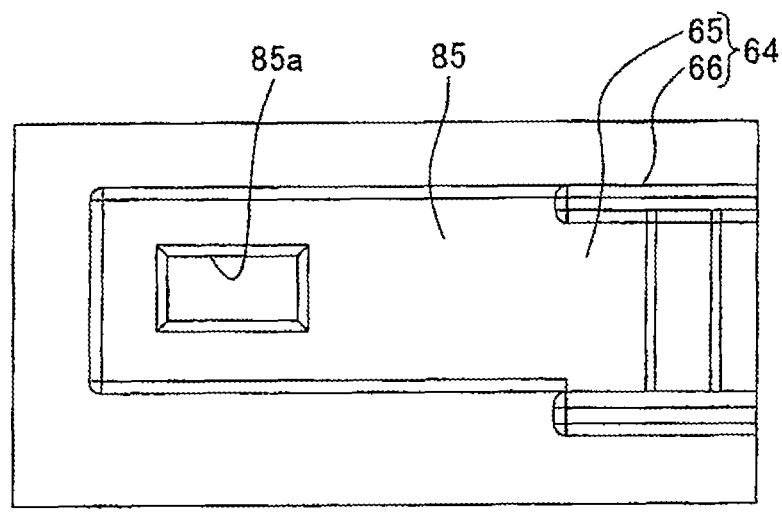
FIG. 6 is a top plan view showing a second connecting piece of the plate which makes up the busbar module shown in FIG. 2.

As is shown in FIG. 6, the second connecting piece 85 has a plate shape as an overall planar shape. The second connecting piece 85 connects to both the other end portion of the bottom wall 65 of the one secondary accommodating portion of the pair of secondary accommodating portions 64 and one end portion of the bottom wall 65 of the other secondary accommodating portion 64 of the pair of secondary accommodating portions 64. Namely, the second connecting piece 85 is provided at least the other end portion 6B (shown in FIG. 2) of the plate 6 in the longitudinal direction thereof (that is, the direction of the arrow X). The second connecting piece 85 includes a hole portion 85a into which the projecting portion 83 of the first connecting piece 81 of the plate 6 laid adjacent thereto penetrates when the first connecting piece 81 is laid thereon. The hole portion 85a has a rectangular shape as a planar shape and penetrates through the second connecting piece 85.

As is shown in FIG. 7, the binding band 86 as the fixing member includes a binding portion (not shown) and a band main body 87. The binding portion has a cylindrical shape and includes a through opening in a center which penetrates therethrough. The band main body 87 has a band shape. One end portion of the band main body 87 connects integrally to the binding portion. The other end portion of the band main body 87 is passed into the through opening so that the other end portion of the band main body 87 and the binding portion are locked on each other. Then, with the electric wires 5 laid on the second connecting piece 85 (a second connecting piece 85B, which will be described later), the other end portion of the band main body 87 is passed into an inside of the hole portion 85a and is then wound around outer circumferences of the second connecting piece 85 (the second connecting piece 85B, which will be described later). Thereafter, the other end portion is passed into the through opening, whereby the binding band 86 fixes the electric wires 5 to the second connecting piece 85 (the second connecting piece 85B, which will be described later).

The voltage detection circuit is an ECU (Electronic Control Unit), which is not shown. The ECU as the voltage detection circuit measures a potential difference between the positive electrode 22 and the negative electrode 23 of each battery.

Hereinbelow, a fabrication method of the busbar module 1 that is configured as has been described above will be described. In building up the busbar module 1, busbars 3, terminals 4 and plates 6 are fabricated separately. Next, a busbar 3 is fitted in each primary accommodating portion 60 of each plate (a busbar 3 may be insert molded in a plate 6). Next, the one end 5A of the electric wire 5 is clamped by the clamping pieces of the electric wire attaching portion 42, and the core wire which is exposed at the one end 5A of the electric wire 5 is clamped by the clamping pieces of the electric wire connector 43, so that the electric wire 5 and the terminal 4 are connected together mechanically and electrically. Next, the busbar connector 41 of the terminal 4 which is connected to the core wire of the electric wire 5 is fitted in the primary accommodating portion 60 so as to be laid on the busbar 3, and the connector between each electric wire 5 and the terminal 4 is accommodated in the predetermined tertiary accommodating portion 68. Thereafter, the electric wire 5 is bent at substantially 90 degrees so as to be accommodated in the secondary accommodating portion 64. As this occurs, the other end portions 5B of the plurality of electric wires 5 which are attached to the electric wire attaching portions 42 and the electric wire connectors 43 of the respective terminals 4 at the one end 5A thereof are accommodated in the secondary accommodating portion 64, whereby the plurality of electric wires 5 are disposed so as to extend from the one end portion 6A of the plate 6 in the longitudinal direction thereof or the direction of the arrow X towards the other end portion 6B. In this way, the plurality of busbars 3, the plurality of terminals 4 and the plurality of electric wires 5 are accommodated in the plate 6. Next, the second connecting piece 85 provided at the other end portion 6B of the adjacent plate 6 in the longitudinal direction thereof or the direction of the arrow X is brought into contact with the first connecting piece 81 of the primary connector 80 which is provided at the one end portion 6A of the plates 6 in the longitudinal direction thereof (that is, the direction of the arrow X) which each accommodate the plurality of busbars 3, the plurality of terminals 4 and the plurality of electric wires 5 and which are aligned along the direction of the arrow X so as to be pressed thereagainst. By doing so, the hole portion 85a of the second connecting piece 85 is passed on the projecting portion 83 of the primary connector 80, and the second connecting piece 85 is locked on the engaging projections 84, whereby the plates 6 which are laid adjacent to each other are connected to each other. As this occurs, the other ends 5B of the plurality of electric wires 5 which are positioned at the other end portion 6B of the plate 6 are disposed so as not only to lie adjacent to each other and but also to extend from the one end portions 6A of the plates 6 which are connected to each other. Next, as is shown in FIGS. 1 and 7, the plurality of electric wires 5 are laid on the second connecting piece 85 (hereinafter, denoted by reference numeral 85B) which is positioned at the end portion of the plurality of plates 6 which are connected to each other (that is, an end portion 1B of the busbar module 1). Then, the other end of the band main body 87 of the binding band 86 is passed into the inside of the hole portion 85a and is wound around the outer circumferences of the second connecting piece 85B and the plurality of electric wires 5. Thereafter, the other end of the band main body 87 is passed into the through opening in the binding portion, whereby the binding band 86 fixes the electric wires 5 to the second connecting piece 85B. The busbar module 1 is built up in this way.

Further, the busbar module 1, which is built up according to the procedure described above, is laid on the upper surface 2a of the battery unit 2 made up of the plurality of batteries. Then, the end portion 1B of the busbar module 1 which is configured by connecting the plurality of plates 6 to each other in the direction of the arrow X is laid on one end of the battery unit 2 in the direction of the arrow X. Then, the electrodes 22, 23 which are positioned at the one end of the battery unit 2 are passed through the holes 3 in the busbar 3 and the hole 41a in the terminal 4. Then, the busbar module 1 is gradually laid on the battery unit 2 therefrom towards the other end side of the battery unit 2. In this way, the whole of the busbar module 1 is laid on the battery unit 2, whereby the busbar module 1 is attached to the battery unit 2. Thereafter, nuts are screwed on to the electrodes 22, 23 which are passed through the holes 3a, 41a and the holes in the primary accommodating portions 60, whereby the electrodes 22, 23 and the busbars 3 are fixed to each other, thereby the power supply unit 10 being built up.

In the power supply unit 10 which is built up in the way described above, the terminals 4 which are connected individually to the busbars 3 which connect the plurality of batteries 20 of the battery unit 2 in series by connecting the electrodes 22, 23 of the batteries 20 which are laid adjacent to each other output potentials of the positive electrodes 22 and the negative electrodes 23 of the respective batteries 20 to the ECU, which functions as the voltage detection circuit, via the electric wires 5 which are connected individually to the terminals 4. The ECU, which functions as the voltage detection circuit, measures a potential difference between the positive electrode 22 and the negative electrode of each battery 20 which face each other in a direction which is at right angles to the direction of the arrow X to thereby measure the residual capacity of each battery 20.

According to the invention, the busbar module 1 includes the connector 8 which connects the plurality of plates 6 together. Thus, there can be provided the busbar module 1 which can prevent the plurality of electric wires 5 which are disposed to extend from the one plate 6 to the other one from being removed from the terminals to which the electric wires 5 are attached when grabbing to carry one of the plurality of plates 6 which are connected to each other.

The connector 8 includes the first connecting piece 81 which is provided at the one end portion 6A of the plate 6 and which includes the projecting portion 83 which projects to rise from the surface thereof and the second connecting piece 85 which is provided at the other end portion 6B of the plate 6 and in which the hole portion 85a is provided into which the projecting portion 83 penetrates when laid on the first connecting piece 81 of the plate 6 laid adjacent thereto. Thus, the plurality of plates 6 can be connected together by the simple work to cause the projecting portion 83 to penetrate into the hole portion 85a.

The plurality of connectors 8 like the connector 8 are provided, and therefore, the plurality of plates 6 can be connected to each other in an ensured fashion.

The engaging projections 84 are provided which are provided on the erected wall portions 82 which are erected from the widthwise edges of the first connecting piece 81 and which locks the second connecting piece 85. Thus, the plurality of plates 6 can be connected to each other in an ensured fashion.

The connector 8 includes the binding band 86 as the fixing member which is passed into the inside of the hole portion 85a with the electric wires 5 laid on the second connecting piece 85B (the second connecting piece 85) and is then wound around the outer circumferences of the second connecting piece 85B and the electric wires 5 to thereafter fix the electric wires 5 to the second connecting piece 85B. Thus, the electric wires 5 can be fixed to the plate 6 in an ensured fashion.

With the plurality of electric wires 5 laid on the second connecting piece 85B, the binding band 86 as the fixing member is wound around the outer circumferences of the second connecting piece 85B and the electric wires 5, whereby the electric wires 5 are fixed to the second connecting piece 85B (the second connecting piece 85) which is positioned at the one end portion 1B of the busbar module 1 (that is, the end portion of the plurality of plates 6). In addition, the plurality of plates 6 are connected to each other by causing the projecting portion 83 of the plate 6 laid adjacent thereto to penetrate into the hole portion 85a of the second connecting piece 85 which is positioned in a different position from the end portion of the plurality of plates 6. In this way, the plate which includes the second connecting piece 85 which fixes the plurality of electric wires 5 to the plate 6 or which connects the plates 6 laid adjacent to each other together can be molded by a single mold, thereby making it possible to reduce the costs.

The binding band 86 is used as the fixing member. The plurality of electric wires 5 can be fixed to the plate 6 in an ensured fashion by simple work to wind the band main body 87 of the binding band 86 around the outer circumferences of the electric wires 5 and the second connecting piece 85 and to pass the other end portion of the band main body 87 through the through opening provided in the binding portion of the binding band 86.

The power supply unit 10 includes the busbar module 1 that has been described above. Thus, there can be provided the power supply unit 10 which can prevent the plurality of electric wires 5 which are disposed to extend from the one plate 6 to the other one 6 from being removed from the terminals 4 to which the electric wires 5 are attached when grabbing to carry one of the plurality of plates 6 which are connected to each other.

According to the embodiment, the hole portion 85a is described as having the rectangular shape as the planar shape. However, the invention is not limited thereto, and the hole portion 85a may have a circular shape as the planar shape.

According to the embodiment, either of the first connecting piece 81 and the second connecting piece 85 is provided at both the end portion of the plate 6 in the width direction thereof or the direction of the arrow Y at the one end portion 6A of the plate 6 in the longitudinal direction thereof or the direction of the arrow X, and either of the first connecting piece 81 and the second connecting piece 85 is provided at both the end portions of the direction of the arrow X at the one end portion of the direction of the arrow Y. However, the invention is not limited thereto. The first connecting piece 81 may be provided at both the end portion of the plate 6 in the width direction thereof or the direction of the arrow Y at the one end portion 6A of the plate 6 in the longitudinal direction thereof or the direction of the arrow X, and the second connecting piece 85 may be provided at both the end portions of the plate 6 in the width direction thereof or the direction of the arrow Y at the other end portion of the plate 6 in the longitudinal direction thereof or the direction of the arrow X.

The embodiment that has been described herein only illustrates the representative form of the invention, and the invention is not limited to the embodiment. Namely, the invention can be carried out by modifying it variously without departing from the spirit and scope thereof.

The present application is based on Japanese Patent Application No. 2009-205578 filed on Sep. 7, 2009, the contents of which are incorporated herein for reference.

INDUSTRIAL APPLICABILITY

The present invention is extremely useful in forming the busbar module which can prevent the electric wire which is disposed to extend from one plate to the other plate of plates which are connected to each other from being removed from the terminal to which the electric wire is attached when grabbing to carry only the one plate and the power supply unit which includes this busbar module.

REFERENCE SIGNS LIST 1 busbar module
2 battery unit
3 busbar
4 terminal
5 electric wire
6 plate
6A one end portion
6B the other end portion
8 connector
10 power supply unit
20 battery
22 positive electrode
23 negative electrode
81 first connecting piece
82 erected wall portion
83 projecting portion 84 engaging projection
85a hole portion
86 binding band

The invention claimed is:

1. A busbar module for connecting a plurality of batteries of a battery unit in which the batteries are arranged so that electrodes of each of the batteries having different polarities are disposed adjacent to each other, the busbar module comprising:
   a plurality of busbars that connect the electrodes adjacent to each other;
   a plurality of terminals connected to the busbars respectively to detect a voltage of the batteries;
   a plurality of wires connected to the terminals respectively;
   a plurality of plates accommodating the busbars, the terminals and the wires, and provided above the battery unit; and
   a connector, configured to mechanically connect the plurality of plates together,
   wherein each of the plurality of plates is independent with respect to each other, and
   wherein the connector includes:
   a first connecting piece provided at one end portion of the plate and formed with a projection; and
   a second connecting piece provided at another end portion of the plate and formed with a hole, wherein the first connecting piece of one of the plates is configured to be inserted into the second connecting piece of another one of the plates adjacent to the one of the plates.

2. The busbar module as set forth in claim 1, wherein a plurality of connectors, like the connector, are provided.

3. The busbar module as set forth in claim 1, wherein a wall portion is provided on a part of the first connecting piece where is an edge portion in a width direction orthogonal to an arrangement direction of the batteries, and
   an engaging projection for engaging the second connecting piece is projected from the wall portion.

4. The busbar module as set forth in claim 1, wherein the connector includes:
   a fixing member, in a state that the wire is laid on the second connecting piece, inserted into the hole and wound around circumferences of the second connecting piece and the wire so as to fix the wire to the second connecting piece.

5. The busbar module as set forth in claim 4, wherein the fixing member is a binding band.

6. A power supply unit, comprising:
   a plurality of batteries of a battery unit in which the batteries are arranged so that electrodes of each of the batteries having different polarities are disposed adjacent to each other; and;
   the busbar module set forth in claim 1.

7. The busbar module of claim 1, wherein each of the plurality of plates are separate from each other.

* * * * *